(12) United States Patent
Sato et al.

(10) Patent No.: US 8,623,517 B2
(45) Date of Patent: Jan. 7, 2014

(54) COPPER-BASED SLIDING MATERIAL

(75) Inventors: Ryo Sato, Inuyama (JP); Takuo Imai, Inuyama (JP); Kentaro Tujimoto, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 0 days.

(21) Appl. No.: 13/572,915

(22) Filed: Aug. 13, 2012

(65) Prior Publication Data
US 2013/0052473 A1 Feb. 28, 2013

(30) Foreign Application Priority Data

Aug. 22, 2011 (JP) ................................ 2011-180394

(51) Int. Cl.
| | | |
|---|---|---|
| *B32B 15/04* | (2006.01) | |
| *B32B 15/18* | (2006.01) | |
| *B32B 15/20* | (2006.01) | |
| *F16J 15/00* | (2006.01) | |
| *F16C 33/02* | (2006.01) | |

(52) U.S. Cl.
USPC ........... 428/677; 428/684; 428/704; 384/276; 277/653

(58) Field of Classification Search
USPC .......... 428/677, 674, 675, 676, 684, 685, 704
See application file for complete search history.

(56) References Cited

U.S. PATENT DOCUMENTS

2011/0206939 A1 * 8/2011 Imai et al. ................... 428/553

FOREIGN PATENT DOCUMENTS

| GB | 2 355 016 | 11/2001 |
| GB | 2 374 086 | 9/2002 |
| JP | 04-028836 | 1/1992 |
| JP | 05-263166 | 10/1993 |
| JP | 2001-081523 | 3/2001 |
| JP | 3421724 | 6/2003 |
| WO | WO 2009/017501 | 2/2009 |
| WO | WO 2010/101899 | 9/2010 |

OTHER PUBLICATIONS

European Search Report mailed Nov. 22, 2012 from corresponding European Patent Application No. EP 12180250.8 (six pages).

* cited by examiner

*Primary Examiner* — Michael La Villa
(74) *Attorney, Agent, or Firm* — Harness, Dickey & Pierce, P.L.C.

(57) ABSTRACT

In a copper-based sliding material in which a Cu alloy layer contains 5% to 30% by mass of Bi, and the balance consisting of Cu and an unavoidable impurity, Bi is dispersed as particles of a Bi phase in the Cu alloy layer, and the mass ratio of the particles having a particle size of 2 to 50 μm and a circularity of 0.1 to 0.7 is 30% or more in the entire Bi phase in the Cu alloy layer, so that the particles of the Bi phase are uniformly dispersed in the Cu alloy layer. Therefore, the particles of the Bi phase in the Cu alloy layer are sequentially exposed to a sliding surface as wear of the sliding material progresses while excessive flow-out of molten Bi is prevented, so that improved seizure resistance is achieved.

7 Claims, 3 Drawing Sheets

COPPER-BASED SLIDING MATERIAL

BACKGROUND OF THE INVENTION

1. Field of the Invention

The present invention relates to a copper-based sliding material having high seizure resistance, and relates to a copper-based sliding material suitable for a plain bearing material.

2. Description of Related Art

Conventionally, a copper-based sliding material used for a plain bearing for an internal combustion engine is generally manufactured by a continuous sintering method. The continuous sintering method is a manufacturing method of continuously spreading Cu alloy powder on strip steel, and continuously performing sintering and rolling. A copper-based sliding material for a plain bearing is required to be free of Pb to respond to recent environment regulations, and a copper-based sliding material using a sintered Cu alloy containing Bi as an alternate material of Pb has been proposed. In the continuous sintering method, Cu alloy powder is spread on strip steel, but as shown in FIG. 6A, there are many gaps in a Cu alloy powder layer. When a temperature is then increased in a primary sintering step, as shown in FIG. 6B, Bi melts at about 270° C. into a liquid phase, and flows out from Cu alloy powder into the gaps between particles. At this time, sintering between Cu alloy particles is still insufficient, and Cu alloys have not been sufficiently bonded to each other. Thus, Bi flowing out into the gaps spreads along powder surfaces, and as shown in FIG. 5, Bi phase particles in a Cu alloy layer form a network. When the Bi phase particles in the Cu alloy layer form the network, the number of Bi phase particles connected in a depth direction from a sliding surface of the Cu alloy layer is increased. Thus, Bi in the Cu alloy layer melts and flows out to the sliding surface under a sliding environment, so that the amount of Bi in the Cu alloy layer is significantly reduced to deteriorate seizure resistance. Thus, it has been proposed to make Bi phase particles in the Cu alloy layer fine, thereby preventing Bi in the Cu alloy layer from melting and flowing out to the sliding surface to increase seizure resistance. For example, see Japanese Patent No. 3421724 (paragraphs 0007 and 0008), JP-A-4-28836 (page 2, right lower column, and page 4, right lower column), and JP-A-5-263166 (paragraphs 0010 and 0013).

BRIEF SUMMARY OF THE INVENTION

In Japanese Patent No. 3421724, a Cu alloy containing Bi contains an inorganic compound to achieve satisfactory seizure resistance. Specifically, if a Cu alloy layer contains an inorganic compound, hard particles are mixed in Bi having melted into a liquid phase in a temperature increasing step in primary sintering, thereby preventing Bi phase particles from forming a network to make the Bi phase particles fine. Also, since the inorganic compound is mixed in the Bi phase particles in the Cu alloy layer, the inorganic compound prevents molten Bi from excessively flowing out to a sliding surface, thereby increasing seizure resistance.

However, in recent years, an untempered soft shaft tends to be used for reducing cost, and therefore the Cu alloy containing the inorganic compound as in the invention described in Japanese Patent No. 3421724 has a defect of causing wear of such a soft shaft. The wear of the shaft may cause a rough surface shape of the shaft, thereby reducing seizure resistance. Thus, it is not preferable that an inorganic compound is contained.

A method for fine dispersion of Bi phase particles without containing an inorganic compound is described in JP-A-4-28836 and JP-A-5-263166. JP-A-4-28836 and JP-A-5-263166 describe that Cu alloy powder containing Bi is produced by a mechanical alloying method, and sintered at a relatively low temperature (400° C. to 800° C., more preferably 400° C. to 700° C.), then Bi phase particles are made fine, Bi in the Cu alloy layer melts and flows out to cover a sliding surface of the Cu alloy layer by heat in sliding with a counterpart shaft, thereby obtaining a copper-based sliding material with high wear resistance.

Then, in order to confirm performance of the copper-based sliding members in JP-A-4-28836 and JP-A-5-263166, the present inventors sintered Cu alloy powder containing Bi produced by the mechanical alloying method under a sintering condition described in paragraphs 0012 and 0013 of JP-A-5-263166, produced a copper-based sliding member, and evaluated performance. As a result, it has been found that if sintering is performed at a temperature of 800° C. or less by a continuous sintering method, steel back metal and a Cu alloy layer are not sufficiently bonded to each other, thereby reducing fatigue resistance, and also, if Bi in the Cu alloy layer melts and flows out to cover a sliding surface, seizure resistance is reduced. It has been also found that if sintering is performed at a temperature higher than 800°, steel back metal and a Cu alloy layer are sufficiently bonded, but as described in paragraph 0014 of JP-A-5-263166, an effect of making Bi phase particles fine at the time of using mechanical alloying powder is reduced, and the Bi phase particles form a network.

The present invention is made in view of the above-described circumstances, and has an object to provide a copper-based sliding material having high seizure resistance by controlling a shape of particles of a Bi phase dispersed in an alloy base in a Cu alloy containing Bi.

To achieve the above-described object, the invention according to a first aspect provides a copper-based sliding material including: a steel back metal layer; and a Cu alloy layer, which Cu alloy layer contains 5% to 30% by mass of Bi, and the balance consisting of Cu and an unavoidable impurity, wherein Bi is dispersed as particles of a Bi phase in the Cu alloy layer, and the mass ratio of the particles having a particle size of 2 to 50 μm and a circularity of 0.1 to 0.7 is 30% or more relative the entire Bi phase in the Cu alloy layer.

According to a second aspect of the invention, the copper-based sliding material of the first aspect is characterized in that the mass ration of the particles having a particle size of 2 to 30 μm and a circularity of 0.1 to 0.7 is 20% or more in the entire Bi phase in the Cu alloy layer.

According to a third aspect of the invention, the copper-based sliding material of the first or second aspect is characterized in that the Cu alloy layer further contains 0.5% to 15% by mass of Sn.

According to a fourth aspect of the invention, the copper-based sliding material of any one of the first to third aspects is characterized in that the Cu alloy layer further contains at least one of elements selected from the group consisting of Ni, Fe, Ag, In, Mn, and Mg in a total amount of 0.1% to 20% by mass.

According to a fifth aspect of the invention, the copper-based sliding material of any one of the first to fourth aspects is characterized in that the Cu alloy layer further contains 0.01% to 0.5% by mass of P.

According to a sixth aspect of the invention, the copper-based sliding material of any one of the first to fifth aspects is characterized in that the Cu alloy layer further contains 0.1% to 10% by mass of an inorganic compound having an average particle size of 0.5 to 5 μm.

In the invention according to the first aspect, the Cu alloy layer contains 5% to 30% by mass of Bi, thereby providing a copper-based sliding material having satisfactory sliding properties. A Bi content of less than 5% by mass cannot provide satisfactory seizure resistance. A Bi content of more than 30% by mass reduces strength of the Cu alloy layer.

It has been found that if Bi phase particles having a good shape, that is, having a particle size of 2 to 50 μm and a circularity of 0.1 to 0.7 are contained in a mass ratio of 30% or more in the entire Bi phase in the Cu alloy layer, satisfactory seizure resistance can be provided. This is based on the following mechanism.

First, when the Bi phase particles have a particle size within a range of 2 to 50 μm, the Bi phase particles independently exist without forming a network in the Cu alloy layer, and thus the Bi phase particles are uniformly dispersed in the Cu alloy layer. Thus, under a sliding environment, the Bi phase particles in the Cu alloy layer are sequentially exposed to a sliding surface as wear of the sliding material progresses, thereby providing satisfactory seizure resistance. When the particle size is less than 2 μm, Bi exposed to the sliding surface immediately melts and flows out in an early stage of sliding, and Bi phases exposed to the sliding surface are reduced to deteriorate seizure resistance. On the other hand, when the particle size is more than 50 μm, the Bi phase particles form a network having a coarse shape, and thus Bi in the Cu alloy layer melts and flows out to the sliding surface, thereby significantly reducing Bi in the Cu alloy layer. Thus, even if a sliding material wears under a sliding environment, the Bi phase is not exposed to the sliding surface, thereby reducing seizure resistance.

The circularity of the Bi phase particle is an index representing how the shape of the Bi phase particle is close to a circle, and expressed by Expression 1 below.

$$\text{Circularity} = (4 \times \pi \times S)/(L)^2 \quad \text{(Expression 1)}$$

where $\pi$ is the circle ratio, S is an area of the Bi phase ($\mu m^2$), and L is the circumferential length of the Bi phase (μm).

In Expression 1, a range of the circularity is larger than 0 and 1 or less. When the circularity is closer to 1, the shape is closer to a circle, and when the circularity is smaller than 1, the shape becomes more complex. For example, the circularity of a particle (a) having a complex shape shown in FIG. 3 and the circularity of a particle (b) having the same area as the particle (a) are calculated. Since the particle (a) and the particle (b) have the same area, the area (S) in the above expression is the same. Thus, the circumferential length (L) in the above expression influences the circularities of the particle (a) and the particle (b). In FIG. 3, when circumferential lengths of the particle (a) and the particle (b) are compared, the particle (a) having a complex shape has a longer circumferential length than the circular particle (b). Specifically, for the circularity in the above expression, the circumferential length (L) in denominator is larger for the particle (a) than for the particle (b), and thus the circularity of the particle (a) is smaller than that of the particle (b). Thus, it is found that a more complex shape increases the circumferential length and thus reduces the circularity. Also, as for the particle (b) (true circle), the circularity is 1 from the above expression. Thus, as the circularity is closer to 1, the shape is closer to a circle, and as the circularity is smaller than 1, the shape is more complex.

When the circularity of the Bi phase particle is 0.1 to 0.7, excessive flow-out of molten Bi is prevented, thereby increasing seizure resistance. This is considered to be for the following reasons. Under a sliding environment, contact between a shaft and a sliding surface increases a temperature of the sliding surface. At this time, Bi that is low melting point metal melts, but if the circularity of the Bi phase particle is within a range of 0.1 to 0.7, the Bi phase having the complex shape increases a contact surface area between the Bi phase and a Cu matrix per unit volume, and increases flow resistance at a contact interface between the molten Bi and the Cu matrix, thereby preventing excessive flow-out of the melting Bi to the sliding surface. On the other hand, when the circularity of the Bi phase particle is more than 0.7, that is, when the shape of the Bi phase particle is close to a circle, the contact surface area between the Bi phase particle and the Cu matrix per unit volume is small, and the flow resistance at the contact interface between the molten Bi and the Cu matrix is small. Thus, the molten Bi excessively flows out to the sliding surface, the Bi phase exposed to the sliding surface is reduced as time progresses, and the shaft and the Cu matrix of the sliding surface easily come into contact with each other, so that seizure resistance is reduced. When the circularity is less than 0.1, the Bi phase particles form a network having a coarse shape. Thus, as described above, Bi in the Cu alloy layer melts and flows out to the sliding surface, thus Bi in the Cu alloy layer is significantly reduced, and the Bi phase exposed to the sliding surface is reduced as time progresses, thereby reducing seizure resistance.

In the present invention, it has been found that in Cu alloy powder containing Bi produced by an atomizing method, by controlling the amount of Bi which is solid-solved in a supersaturated manner in a Cu phase in the Cu alloy powder to be reduced, the shape of the Bi phase particle can be controlled within the above-described range (a particle size of 2 to 50 μm and a circularity of 0.1 to 0.7). This is considered to be for the following reasons. In the Cu alloy containing Bi, the higher the melting temperature is, the larger the amount of Bi solid-solved in the Cu phase is. Thus, when the Cu alloy is rapidly solidified from a hot molten metal state in an atomizing step, Bi is partly solid-solved in the Cu phase in a supersaturated manner. As such, the state where Bi is solid-solved in the Cu phase in a supersaturated manner is unstable, thus active Bi in the unstable state precipitates on a powder surface in a temperature increasing step in sintering, and precipitated Bi forms a liquid phase and flows out into a gap between powders. Thus, as shown in FIG. 5, the Bi phase particles form a network. In order to prevent the Bi phase particles from forming a network, an amount of Bi solid-solved in the Cu phase in a supersaturated manner needs to be reduced. Specifically, the temperature for rapid solidification is desirably reduced to reduce the amount of Bi solid-solved in the Cu phase in molten metal. Thus, in the present invention, a molten metal temperature in atomizing is controlled within a range of 1000° C. to 1200° C. lower than a general temperature (1300° C. to 1500° C.), and a rapid cooling start temperature is reduced to reduce the amount of Bi solid-solved in the Cu phase in a supersaturated manner. As shown in FIG. 2(*b*), using such powder reduces the amount of Bi seeping out to the powder surface in the temperature increasing step in sintering, thereby preventing the Bi phase particles from forming a network. As shown in FIG. 1, a fine Bi phase particle has a complex shape (irregular shape) with an irregular outline. When the Bi phase particles having the shape within the above-described range (particle size of 2 to 50 μm and circularity of 0.1 to 0.7) are contained in a ratio of at least 30% by mass in the entire Bi phase in the Cu alloy layer, there is Bi phases always exposed to the sliding surface even if the remaining Bi phase particles do not have the shape within the above range, thereby providing satisfactory seizure resistance.

Also, as in the invention according to the second aspect, it has been found that in the copper-based sliding material of the first aspect, when Bi phase particles having a particle size of 2 to 30 μm and a circularity of 0.1 to 0.7 are contained in a mass ratio of 20% or more in the entire Bi phase in the Cu alloy layer, the fatigue resistance is further increased.

As in the invention according to the third aspect, Sn may be contained to reinforce the Cu alloy layer. Sn less than 0.5% by mass cannot achieve this effect. Also, if Sn more than 15% by mass is contained in the Cu alloy layer, the Cu matrix becomes brittle to reduce fatigue resistance.

As in the invention according to the fourth aspect, at least one of elements selected from the group consisting of Ni, Fe, Ag, In, Mn, and Mg may be contained to reinforce the Cu alloy layer. With a content less than 0.1% by mass, the Cu alloy layer is insufficiently reinforced. With a total amount of more than 20% by mass, the Cu alloy layer becomes brittle to reduce fatigue resistance.

As in the invention according to the fifth aspect, P may be contained to reinforce the Cu alloy layer. With a content of P less than 0.01% by mass, the Cu alloy layer is insufficiently reinforced. With a content of P more than 0.5% by mass, the Cu alloy layer becomes brittle to reduce fatigue resistance.

Further, as in the invention according to the sixth aspect, an inorganic compound may be contained to reinforce the Cu alloy layer. The inorganic compound includes carbide, nitride, silicide, boride, and phosphide. The carbide may include $Mo_2C$, WC, TiC, TaC, or the like. The nitride may include AlN, $Si_3N_4$, or the like. The silicide may include SiC, $TaSi_2$, $WSi_2$, or the like. The boride may include MoB or the like. The phosphide may include $Fe_2P$, $Fe_3P$ or the like. With a content less than 1% by mass, the Cu alloy layer is insufficiently reinforced. With a content of more than 10% by mass, the inorganic compound locally agglutinates in the Cu alloy layer to reduce fatigue resistance.

DETAILED DESCRIPTION OF THE INVENTION

Figure 1:
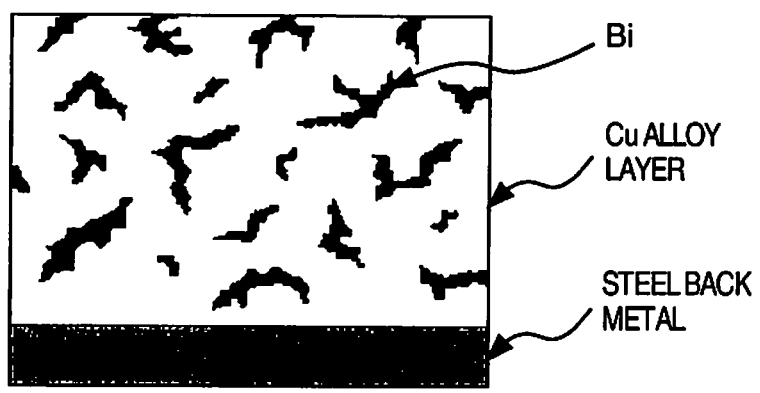
FIG. 1 is a schematic sectional view of constitution of a Cu alloy layer in a copper-based sliding material according to the present invention.
Figure 2A:
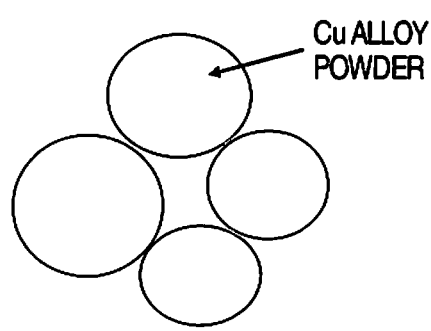
FIGS. 2A and 2B illustrate the seeping amount of Bi in production steps of the Cu alloy layer in the copper-based sliding material according to the present invention.
Figure 2B:
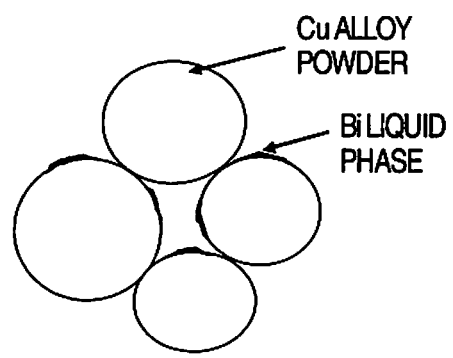
Figure 3:
FIG. 3 illustrates circularities.

Hereinafter, an embodiment of the present invention will be described. In the embodiment, as for Examples 1 to 10 and Comparative examples 1 to 6 using a Cu alloy containing Bi, the shape (particle size and circularity) of a Bi phase particle and a mass ratio of a Bi phase were measured, and a seizure test and a bearing fatigue test were performed. Compositions of Examples 1 to 10 and Comparative examples 1 to 6 are shown in Table 1. The bearing fatigue test was performed only for Examples 1, 4 and 5 and Comparative examples 1 and 4 among Examples 1 to 10 and Comparative examples 1 to 6.

In Examples 1 to 10, the molten metal temperatures at the time of atomizing of Cu alloys having compositions shown in Table 1 are controlled to be at 1100° C. in Examples 1 to 3 and 6 to 10, at 1200° C. in Example 4, and at 1000° C. in Example 5 to produce Cu alloy powder in which the amount of Bi solid-solved in a Cu phase in a supersaturated manner is controlled to be small. In Examples 1 to 9, the Cu alloy powder produced by the atomizing method was spread on strip steel, and sintering and rolling were repeated to produce a sliding material. Sintering was performed at a temperature of 820° C. in Examples 3 and 6, at 850° C. in Examples 1, 4, 5 and 9, and at 900° C. in Examples 2, 7 and 8. The sliding material was machined into a semicircular shape to produce a plain bearing. On the other hand, in Example 10, the Cu alloy powder produced by the atomizing method was mixed with an inorganic compound using a general mixer, and the powder after mixing was used to produce a sliding material by the same production method as in Examples 1 to 9 to produce a plain bearing. Sintering in Example 10 was performed at 850° C. An inorganic compound used in Example 10 was $Mo_2C$ having an average particle size of 2 μm.

TABLE 1

| | | COMPONENT OF Cu ALLOY (% BY MASS) | | | | | | | | INORGANIC COMPOUND (% BY MASS) | MASS RATIO OF Bi PHASE (%) | | MOLTEN METAL TEMPERATURE IN ATOMIZING (° C.) | SEIZURE RESISTANCE (MPa) |
|---|---|---|---|---|---|---|---|---|---|---|---|---|---|---|
| | | | | | | | | | | | Bi PHASE PARTICLE WITH PARTICLE SIZE OF 2 TO 50 μm AND CIRCULARITY OF 0.1 TO 0.7 | Bi PHASE PARTICLE WITH PARTICLE SIZE OF 2 TO 30 μm AND CIRCULARITY OF 0.1 TO 0.7 | | |
| | | Cu | Bi | Sn | Ni | Fe | Ag | Mn | Mg | P | | | | | |
| EXAMPLE | 1 | rem. | 17.5 | | | | | | | | | 42 | 18 | 1100 | 60 |
| | 2 | rem. | 5 | | | | | | | | | 35 | 15 | 1100 | 55 |
| | 3 | rem. | 30 | | | | | | | | | 33 | 13 | 1100 | 55 |
| | 4 | rem. | 17.5 | | | | | | | | | 31 | 12 | 1200 | 55 |
| | 5 | rem. | 17.5 | | | | | | | | | 52 | 21 | 1000 | 70 |
| | 6 | rem. | 17.5 | 6 | | | | | | | | 39 | 15 | 1100 | 60 |
| | 7 | rem. | 17.5 | | 3 | 0.5 | 1 | | | | | 38 | 15 | 1100 | 60 |
| | 8 | rem. | 17.5 | | | | | 3 | 0.2 | | | 40 | 16 | 1100 | 60 |
| | 9 | rem. | 17.5 | | | | | | | 0.1 | | 38 | 15 | 1100 | 60 |
| | 10 | rem. | 17.5 | | | | | | | | 2 | 43 | 19 | 1100 | 60 |

TABLE 1-continued

| | | COMPONENT OF Cu ALLOY (% BY MASS) | | | | | | | | INORGANIC COMPOUND (% BY MASS) | MASS RATIO OF Bi PHASE (%) | | MOLTEN METAL TEMPERATURE IN ATOMIZING (°C.) | SEIZURE RESISTANCE (MPa) |
|---|---|---|---|---|---|---|---|---|---|---|---|---|---|---|
| | | | | | | | | | | | Bi PHASE PARTICLE WITH PARTICLE SIZE OF 2 TO 50 μm AND CIRCULARITY OF 0.1 TO 0.7 | Bi PHASE PARTICLE WITH PARTICLE SIZE OF 2 TO 30 μm AND CIRCULARITY OF 0.1 TO 0.7 | | |
| | | Cu | Bi | Sn | Ni | Fe | Ag | Mn | Mg | P | | | | | |
| COMPARATIVE EXAMPLE | 1 | rem. | 17.5 | | | | | | | | | 18 | 10 | 1400 | 30 |
| | 2 | rem. | 4 | | | | | | | | | 25 | 11 | 1100 | 25 |
| | 3 | rem. | 35 | | | | | | | | | 21 | 6 | 1100 | 25 |
| | 4 | rem. | 17.5 | | | | | | | | | 20 | 11 | — | 30 |
| | 5 | rem. | 17.5 | | | | | | | | | 17 | 6 | — | 30 |
| | 6 | rem. | 17.5 | | | | | | | | 2 | 28 | 13 | 1400 | 40 |

As for Comparative examples 1 to 6, Comparative examples 1 and 6 used Cu alloy powder in which a larger amount of Bi was solid-solved in a Cu phase in a supersaturated manner than those in other Examples by controlling a molten metal temperature in atomizing to be at 1400° C. In Comparative example 1, Cu alloy powder which is controlled so that a molten metal temperature in atomizing is at 1400° C. was used to produce a sliding material with component percentages in Table 1 by the same production method as Examples 1 to 9 to produce a plain bearing. In Comparative example 6, Cu alloy powder which is controlled so that a molten metal temperature in atomizing is controlled at 1400° C. was mixed with an inorganic compound (in Comparative example 6, $MO_2C$ having an average particle size of 2 μm was used) using a general mixer, and the power after mixing was used to produce a sliding material so as to have the component percentages in Table 1 by the same production method as in Examples 1 to 9 to produce a plain bearing. For Comparative examples 2 and 3, Cu alloy powder which is controlled so that a molten metal temperature in atomizing is at 1100° C. was used to produce a sliding material so as to have the component percentages in Table 1 by the same production method as Examples 1 to 9 to produce a plain bearing. For Comparative examples 4 and 5, Cu alloy powder was produced so as to have the alloy component percentages in Table 1 by a mechanical alloying method, the produced powder was spread on strip steel, sintering and rolling were repeated to produce a sliding material, and the sliding material was machined into a semicylindrical shape to produce a plain bearing. Sintering was performed at a temperature of 700° C. in Comparative example 4, at 820° C. in Comparative example 3, at 850° C. in Comparative example 1, 5 and 6, and at 900° C. in Comparative example 2.

Figure 4:
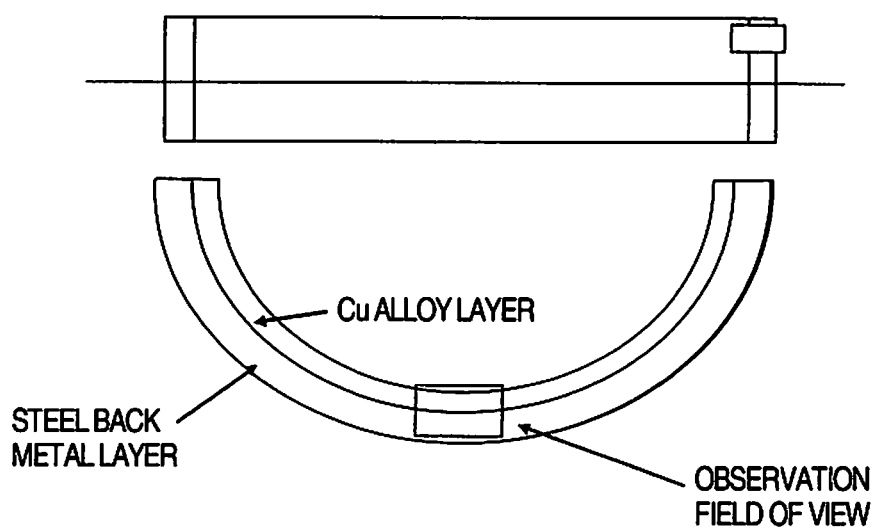
FIG. 4 is a schematic view of a plain bearing for illustrating an observation region of a test result.
Figure 5:
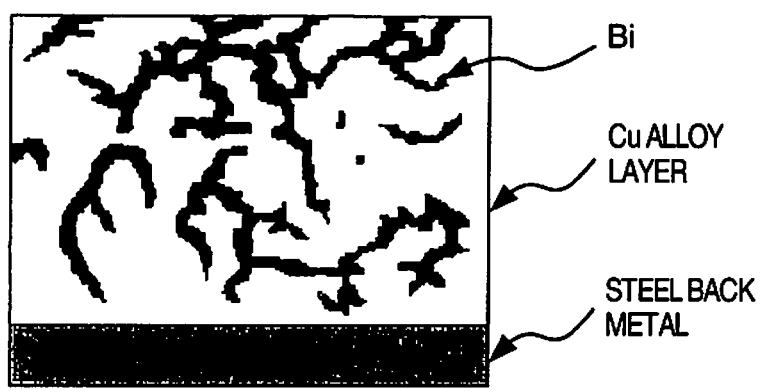
FIG. 5 is a schematic sectional view showing constitution of a Cu alloy layer in a conventional copper-based sliding material.
Figure 6A:
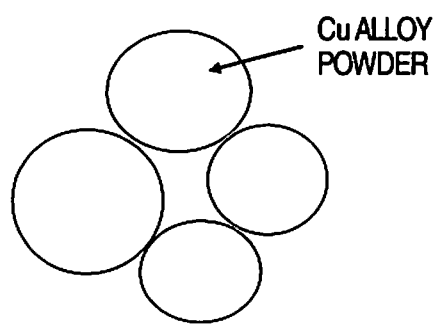
FIGS. 6A and 6B illustrate the seeping amount of Bi in production steps of the Cu alloy layer in the conventional copper-based sliding material.
Figure 6B:
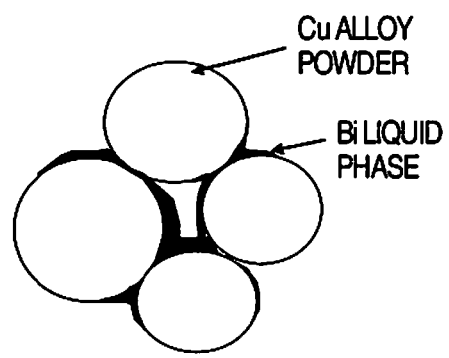

Next, for the produced plain bearing, a composition image of a section in a circumferential direction of the bearing in an observation field shown in FIG. 4 was taken through 200 times power of an electron microscope, and an average particle size of the Bi phase particle was measured. Specifically, the obtained composition image was analyzed using a general image analysis method (analysis software: Image-ProPlus (Version 4.5): manufactured by Planetron Inc.), an area of each Bi phase particle was measured, and a corresponding circle diameter was calculated from Expression 2 to be used as a particle size of the Bi phase particle. This corresponding circle diameter of the Bi phase particle means a diameter of a circle when the Bi phase particle is substituted by a circle having the same area as the Bi phase particle, and defined as expressed in Expression 2 below.

$$\text{Corresponding Circle Diameter} = \sqrt{(4 \times S/\pi)} \quad \text{(Expression 2)}$$

where $\pi$ is a circle ratio, and S is an area of the Bi phase ($\mu m^2$). For the circularity of the Bi phase particle, the obtained composition image was analyzed using the same analysis software, and calculated by Expression 1 mentioned above.

As a mass ratio of the Bi phase in the present invention, an area ratio correlating to the mass ratio is alternatively used. The area ratio is a ratio of an area of the Bi phase particles which are within the ranges of the particle size and the circularity described above relative to the area of all Bi phases in any field of view of the taken composition image. Specifically, the area ratio is B/A where A is the area of all Bi phases, and B is the area of the Bi phase particles which are within the ranges of the particle size and the circularity described above. Since the Bi phases in the Cu alloy layer exist three-dimensionally, the Bi phases observed in the section in the circumferential direction of the bearing are merely on a cut surface at a certain position of the Bi phase particles three-dimensionally existing. However, when observing the Bi phase particles in the section of the circumferential direction of the bearing in a sufficiently large field, the area of the Bi phase observed in the section of the circumferential direction of the bearing correlates to the mass of the Bi phases in the Cu alloy layer, and thus the area ratio can be used instead of the mass ratio of the Bi phase. Thus, in the present invention, an obtained composition image was analyzed using a general image analysis method (analysis software: Image-ProPlus (Version 4.5): manufactured by Planetron Inc.), areas of all Bi phases in the measured field and the area of the Bi phase particles which are within the ranges of the particle size and the circularity described above were measured, an area ratio was calculated from the ratio therebetween, and the area ratio was used as a mass ratio of the Bi phase in the present invention.

A test condition of the seizure test is shown in Table 2. In the seizure test, a load is applied to an inner surface of the bearing, and maximum surface pressure without seizure in a predetermined test time was evaluated as seizure resistance. This test was performed using an untempered steel shaft.

TABLE 2

SEIZURE TEST

| ITEM | CONDITION |
|---|---|
| TEST LOAD | INCREASE BY 5 MPa EVERY 10 MINUTES |
| SPEED | 15 m/min |
| LUBRICANT | SAE#10 |
| LUBRICANT TEMPERATURE | 130° C. |
| MATERIAL OF SHAFT | S55C (WITHOUT QUENCHING) |
| ROUGHNESS OF SHAFT | Rz 1.0 μm OR LESS |

A test condition of a bearing fatigue test is shown in Table 3. In the bearing fatigue test, a dynamic load was applied to the inner surface of the bearing, and maximum surface pressure without fatigue in a predetermined test time was evaluated as fatigue resistance. This test was performed using an untempered steel shaft.

TABLE 3

FATIGUE TEST

| ITEM | CONDITION |
|---|---|
| TEST LOAD | 30 hr |
| SPEED | 20 m/min |
| LUBRICANT | SAE#10 |
| LUBRICANT TEMPERATURE | 120° C. |
| MATERIAL OF SHAFT | S55C (WITHOUT QUENCHING) |
| ROUGHNESS OF SHAFT | Rz 1.0 μm OR LESS |

First, the result of the seizure test will be described with reference to Table 1. As shown in the final column in Table 1, Examples 1 to 10 according to the present invention all have satisfactory seizure resistance as compared to Comparative examples 1 to 6. In Examples 1 to 5, since the shape of the Bi phase particles satisfies the range that "Bi phase particles with a particle size of 2 to 50 μand a circularity of 0.1 to 0.7 are contained in a mass ratio of 30% or more in all Bi phases in the Cu alloy layer (hereinafter referred to as "proper range")". This prevents Bi in the Cu alloy layer from melting and excessively flowing out to the sliding surface during sliding, and thus Examples 1 to 5 all have satisfactory seizure resistance as compared to Comparative examples 1 to 6. Example 6, in which Sn is added to the Cu alloy layer in Example 1, has seizure resistance equal to Example 1. Similarly, Example 7 in which the Cu alloy layer in Example 1 is made to contain Ni, Fe and Ag, Example 8 in which the Cu alloy layer in Example 1 is made to contain Mn and Mg, and Example 9 in which the Cu alloy layer in Example 1 is made to contain P each have seizure resistance equal to Example 1. Further, Example 10 in which the Cu alloy layer in Example 1 is made to contain an inorganic compound has seizure resistance equal to Example 1. In Example 10, a small amount of Bi seeps out to the Cu alloy powder surface in sintering, and thus an inorganic compound is uniformly dispersed in a Cu matrix and the Bi phase in the Cu alloy layer. Thus, the inorganic compound is uniformly dispersed and exposed to the sliding surface of the copper-based sliding material, thereby reducing wear of a counterpart shaft in sliding. Thus, even if the Cu alloy layer contains the inorganic compound, seizure resistance is not reduced as in Comparative example 6, and the Cu alloy layer in Example 10 has seizure resistance equal to Example 1.

On the other hand, in Comparative example 1, since a molten metal temperature in atomizing is 1400° C. and high equally to conventional atomizing powder, many Bi phase particles are coarse and have a circularity of less than 0.1, so that the proper range of the shape of the Bi phase particle is not satisfied. Thus, Comparative example 1 provides lower seizure resistance than Examples 1 to 10. In Comparative example 2, since a Bi content is low, many Bi phase particles are fine and have circularity of more than 0.7, so that the proper range of the shape of the Bi phase particle is not satisfied. Thus, Comparative example 2 provides lower seizure resistance than Examples 1 to 10. Similarly, in Comparative example 3, since a Bi content is high, many Bi phase particles are coarse and have circularity of less than 0.1, so that the proper range of the shape of the Bi phase particle is not satisfied. Thus, Comparative example 3 provides lower seizure resistance than Examples 1 to 10. In Comparative example 4, mechanical alloying powder is used, and thus many Bi phase particles are fine but have circularity of more than 0.7, so that the proper range of the shape of the Bi phase particle is not satisfied. Thus, Comparative example 4 provides lower seizure resistance than Examples 1 to 10. In Comparative example 5, a sintering temperature is 850° C. and high, and thus sintering between Cu alloy powders excessively advances. Therefore, an effect of making the Bi phase particle fine when using the mechanical alloying powder is reduced, so that many Bi phase particles are coarse and have circularity of less than 0.1, and the proper range of the shape of the Bi phase particle is not satisfied. Thus, Comparative example 5 provides lower seizure resistance than Examples 1 to 10. Further, in Comparative example 6, a molten metal temperature in atomizing is 1400° C. and high, but an Cu alloy layer contains an inorganic compound to prevent Bi phase particles from forming a network, thereby meeting the proper range of the shape of the Bi phase particle. However, the inorganic compound in the Cu alloy layer causes wear of a counterpart shaft, and thus Comparative example 6 provides lower seizure resistance than Examples 1 to 10. In Comparative example 6, a molten metal temperature in atomizing is 1400° C. and high, and thus a large amount of Bi seeps out to a Cu alloy powder surface in sintering, the inorganic compound moves together with Bi in a liquid phase flowing through a gap between the powders, and agglutinates in the Bi phase. Thus, the inorganic compound coagulating on a sliding surface comes into partial contact with a shaft, and Comparative example 6 is more likely to cause wear of a counterpart shaft as compared to Example 10, increase surface roughness of the counterpart shaft, and reduces seizure resistance.

Next, the result of the bearing fatigue test will be described with reference to Table 4. As shown in the final column in Table 4, Example 5 has more satisfactory fatigue resistance than Examples 1 and 4 and Comparative examples 1 and 4. In Example 5, a molten metal temperature in atomizing is 1000° C. and lower than that in other Examples 1 and 4 and Comparative example 1, and thus a smaller amount of Bi is solid-solved in a Cu phase in the Cu alloy powder in a supersaturated manner. Thus, a smaller amount of Bi seeps out to a Cu alloy powder surface in a temperature increasing step in sintering, and the Bi phase particles are fine, providing high fatigue resistance.

TABLE 4

| | | COMPOSITION OF Cu ALLOY (% BY MASS) | | | | | | | | | INORGANIC COMPOUND (% BY MASS) | Bi PHASE PARTICLE WITH PARTICLE SIZE OF 2 TO 50 μm AND CIRCULARITY OF 0.1 TO 0.7 | Bi PHASE PARTICLE WITH PARTICLE SIZE OF 2 TO 30 μm AND CIRCULARITY OF 0.1 TO 0.7 | MOLTEN METAL TEMPERATURE-IN ATOMIZING (°C.) | SEIZURE RESISTANCE (MPa) |
|---|---|---|---|---|---|---|---|---|---|---|---|---|---|---|---|
| | | Cu | Bi | Sn | Ni | Fe | Ag | Mn | Mg | P | | | | | |
| EXAMPLE | 1 | rem. | 17.5 | | | | | | | | | 42 | 18 | 1100 | 60 |
| | 4 | rem. | 17.5 | | | | | | | | | 31 | 12 | 1200 | 55 |
| | 5 | rem. | 17.5 | | | | | | | | | 52 | 21 | 1000 | 80 |
| COMPARATIVE EXAMPLE | 1 | rem. | 17.5 | | | | | | | | | 18 | 10 | 1400 | 55 |
| | 4 | rem. | 17.5 | | | | | | | | | 20 | 11 | — | 20 |

In Comparative example 4, the mechanical alloying powder is used, and thus Bi phase particles are fine but a sintering temperature is 700° C. and low. Thus, adhesiveness between the Cu alloy layer and the steel back metal layer is low, and Comparative example 4 provides extremely lower fatigue resistance than Examples 1, 4 and 5.

The copper-based sliding material according to this embodiment is not limited to a plain bearing material for an internal combustion engine, but may be applied to a plain bearing material of various industrial machines. Also, the copper-based sliding material according to this embodiment is used as a multilayer bearing including an overlay layer formed on a Cu alloy layer.

The invention claimed is:

1. A sliding material comprising: a steel back metal layer; and a Cu alloy layer, the Cu alloy layer comprising 5% to 30% by mass of Bi, and the balance being Cu and an unavoidable impurity, wherein
    Bi is dispersed as particles of a Bi phase in the Cu alloy layer, and the mass ratio of the particles having a particle size of 2 to 50 μm and a circularity of 0.1 to 0.7 in a cross-section in a vertical direction to a sliding surface of the Cu alloy layer is 30% or more in the entire Bi phase in the Cu alloy layer.

2. The sliding material according to claim 1, wherein the mass ratio of the particles having a particle size of 2 to 30 μm and a circularity of 0.1 to 0.7 is 20% or more in the entire Bi phase in the Cu alloy layer.

3. The sliding material according to claim 2, wherein the Cu alloy layer further comprises 0.1% to 10% by mass of an inorganic compound having an average particle size of 0.5 to 5 μm.

4. The sliding material according to claim 1, wherein the Cu alloy layer further comprises 0.5% to 15% by mass of Sn.

5. The sliding material according to claim 1, wherein the Cu alloy layer further comprises at least one of elements selected from the group consisting of Ni, Fe, Ag, In, Mn, and Mg in a total amount of 0.1% to 20% by mass, and/or 0.01% to 0.5% by mass of P.

6. The sliding material according to claim 1, wherein the Cu alloy layer further comprises: 0.5% to 15% by mass of Sn; at least one of elements selected from the group consisting of Ni, Fe, Ag, In, Mn, and Mg in a total amount of 0.1% to 20% by mass; and 0.01% to 0.5% by mass of P.

7. The sliding material according to claim 1, wherein the Cu alloy layer further comprises 0.1% to 10% by mass of an inorganic compound having an average particle size of 0.5 to 5 μm.

* * * * *